US011521603B2

(12) United States Patent
Sun et al.

(10) Patent No.: US 11,521,603 B2
(45) Date of Patent: Dec. 6, 2022

(54) AUTOMATICALLY GENERATING CONFERENCE MINUTES

(71) Applicant: BEIJING BAIDU NETCOM SCIENCE AND TECHNOLOGY CO., LTD., Beijing (CN)

(72) Inventors: Ke Sun, Beijing (CN); Ying Liu, Beijing (CN); Kai Liu, Beijing (CN); Lei Han, Beijing (CN); Chao Wang, Beijing (CN); Yingzhuo Song, Beijing (CN); Shuai Gao, Beijing (CN); Liyan Yang, Beijing (CN); Qianqian Wang, Beijing (CN); Jing Liu, Beijing (CN); Di Wei, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 245 days.

(21) Appl. No.: 17/061,353

(22) Filed: Oct. 1, 2020

(65) Prior Publication Data

US 2021/0407499 A1 Dec. 30, 2021

(30) Foreign Application Priority Data

Jun. 30, 2020 (CN) .......................... 202010624083.7

(51) Int. Cl.
*G10L 15/183* (2013.01)
*G10L 15/26* (2006.01)
*H04L 12/18* (2006.01)

(52) U.S. Cl.
CPC ............ *G10L 15/183* (2013.01); *G10L 15/26* (2013.01); *H04L 12/1813* (2013.01)

(58) Field of Classification Search
CPC .... G10L 15/183; G10L 15/26; H04L 12/1813
See application file for complete search history.

(56) References Cited

U.S. PATENT DOCUMENTS

| 8,914,452 B2 | 12/2014 | Boston et al. |
| 2015/0350258 A1 | 12/2015 | Griffin et al. |
| 2018/0151177 A1* | 5/2018 | Gemmeke ........... G10L 15/1822 |
| 2019/0327103 A1 | 10/2019 | Niekrasz |

(Continued)

FOREIGN PATENT DOCUMENTS

| CN | 101520894 A | 9/2009 |
| CN | 104103082 A | 10/2014 |
| CN | 104536950 A | 4/2015 |

(Continued)

*Primary Examiner* — Michelle M Koeth
*Assistant Examiner* — Darioush Agahi
(74) *Attorney, Agent, or Firm* — Seed IP Law Group LLP (57) ABSTRACT

A conference minutes generation method is provided, which relates to the technical field of natural language processing. The conference minutes generation method comprises: acquiring a text conference record; dividing the text conference record into a plurality of conference paragraphs, generating a conference paragraph summary for each conference paragraph, and generating a conference record summary based on the conference paragraph summary of each conference paragraph; extracting conference instructions based on the text conference record; and generating the conference minutes based on the conference record summary and the conference instructions.

16 Claims, 6 Drawing Sheets

(56) References Cited

U.S. PATENT DOCUMENTS

2019/0384854 A1    12/2019  Mahmoud
2020/0081909 A1     3/2020  Li et al.

FOREIGN PATENT DOCUMENTS

| CN | 104851102 A   | 8/2015 |
|----|---------------|--------|
| CN | 107562728 A   | 1/2018 |
| CN | 110782420 A   | 2/2020 |
| CN | 110889292 A   | 3/2020 |
| CN | 111259158 A   | 6/2020 |
| JP | 2002169939 A  | 6/2002 |
| JP | 2006-18691 A  | 1/2006 |
| JP | 2012174194 A  | 9/2012 |
| JP | 2020-42229 A  | 3/2020 |
| JP | 2020-52511 A  | 4/2020 |

* cited by examiner

AUTOMATICALLY GENERATING CONFERENCE MINUTES

CROSS REFERENCE TO RELATED APPLICATION

This application claims priority to Chinese Patent Application No. 202010624083.7, filed on Jun. 30, 2020, the contents of which are hereby incorporated by reference in their entirety for all purposes.

TECHNICAL FIELD

The present disclosure relates to the technical field of natural language processing, and in particular to a conference minutes generation method and apparatus, an electronic device, and a computer-readable storage medium.

BACKGROUND ART

Conferences are very common in office scenes. In order to record conference content, conference recording is usually made. With the increasing development of science and technology, audio conferences and video conferences have more and more wide applications. For each conference, conference minutes are usually made by people. However, specially-assigned manpower is required to organize the conference minutes after the conference, which is time-consuming and labor-consuming.

The methods described in this section are not necessarily methods that have been previously conceived or employed. It should not be assumed that any of the methods described in this section are considered to be the prior art just because they are included in this section, unless otherwise indicated expressly. Similarly, the problem mentioned in this section should not be considered to be universally recognized in any prior art, unless otherwise indicated expressly.

BRIEF SUMMARY

According to an aspect of the present disclosure, a conference minutes generation method is provided, comprising: acquiring a text conference record; dividing the text conference record into a plurality of conference paragraphs, generating a conference paragraph summary for each conference paragraph, and generating a conference record summary based on the conference paragraph summary of each conference paragraph; extracting conference instructions based on the text conference record; and generating the conference minutes based on the conference record summary and the conference instructions.

According to another aspect of the present disclosure, a conference minutes generation apparatus is further provided, comprising: an acquisition module configured to acquire a text conference record; a summary extraction module configured to divide the text conference record into a plurality of conference paragraphs, generate a conference paragraph summary for each conference paragraph, and generate a conference record summary based on the conference paragraph summary of each conference paragraph; a conference instruction extraction module configured to extract conference instructions based on the text conference record; and a conference minutes generation module configured to generate the conference minutes based on the conference record summary and the conference instructions.

According to another aspect of the present disclosure, an electronic device is further provided, comprising: a processor; and a memory that stores a program, the program comprising instructions that, when executed by the processor, cause the processor to perform the conference minutes generation method described above.

According to another aspect of the present disclosure, a computer-readable storage medium that stores a program is further provided, the program comprising instructions that, when executed by a processor of an electronic device, cause the electronic device to perform the conference minutes generation method.

By providing the conference minutes generation method and apparatus, the electronic device, and the computer-readable storage medium that are described above, conference minutes can be extracted intelligently, thereby reducing time and manpower costs.

BRIEF DESCRIPTION OF THE DRAWINGS

Embodiments are shown in some embodiments, in the drawings and form a part of the specification together with a written description of the specification to explain the example implementations of the embodiments. The embodiments shown are merely for illustrative purposes and do not limit the scope of the claims. Throughout the drawings, like reference signs denote like but not necessarily identical elements.

DETAILED DESCRIPTION OF EMBODIMENTS

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the element, and in some cases, based on contextual descriptions, they may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

The conference minutes generation method according to an embodiment of the present disclosure will be described in detail below in conjunction with the drawings.

Figure 1:
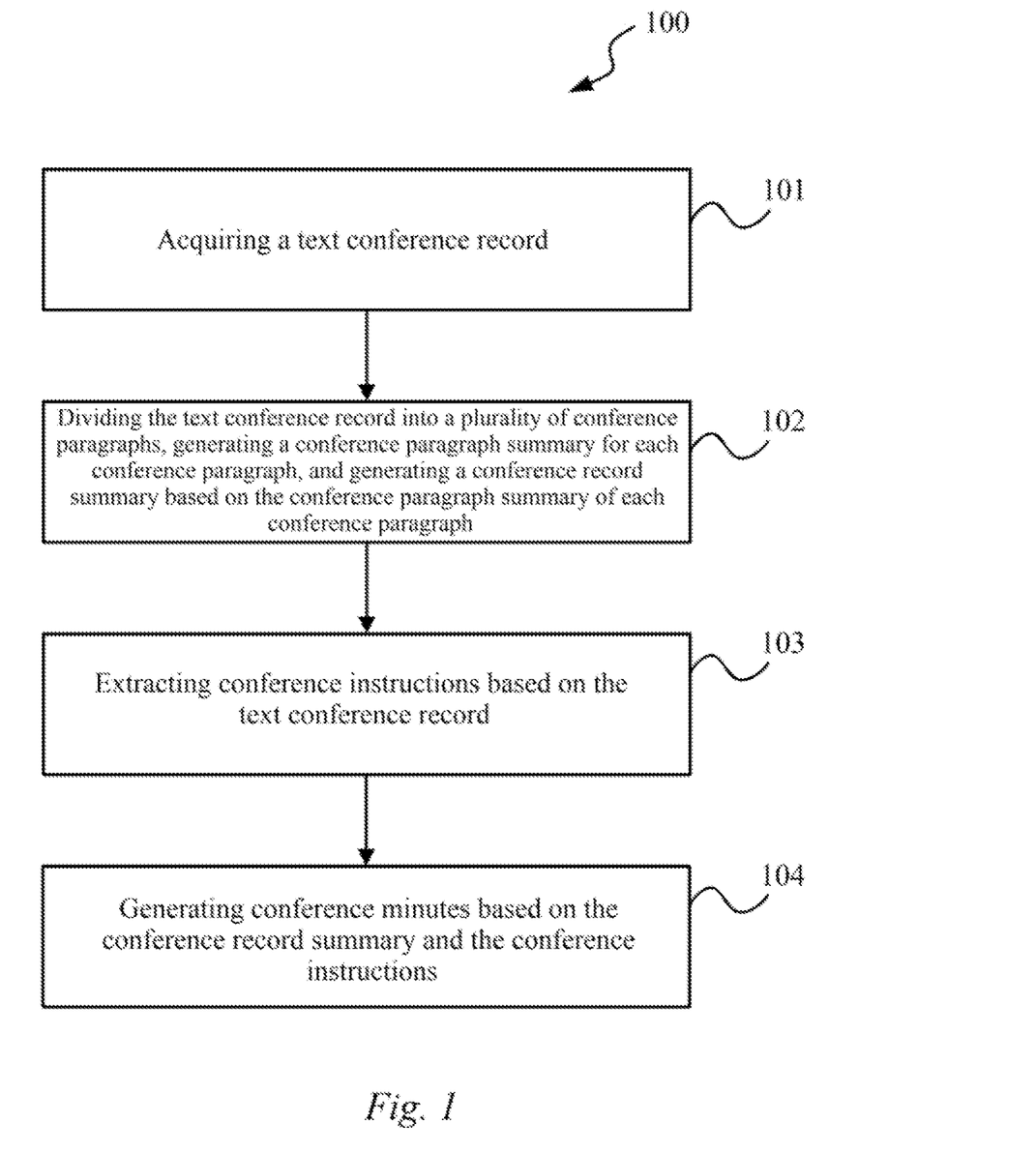
FIG. 1 is a flowchart showing a conference minutes generation method according to one embodiment of the present disclosure.

FIG. 1 is a flowchart showing a conference minutes generation method according to one embodiment of the present disclosure.

According to some example implementations, the conference minutes generation method shown in FIG. 1 may comprise:

step 101, acquiring a text conference record;

step 102, dividing the text conference record into a plurality of conference paragraphs, generating a conference paragraph summary for each conference paragraph, and generating a conference record summary based on the conference paragraph summary of each conference paragraph;

step 103, extracting conference instructions based on the text conference record; and step 104, generating the conference minutes based on the conference record summary and the conference instructions.

Based on the conference minutes generation method described above, no specially-assigned manpower is required to draft conference minutes, and the conference minutes can be extracted intelligently, thereby reducing time and manpower costs.

Figure 2:
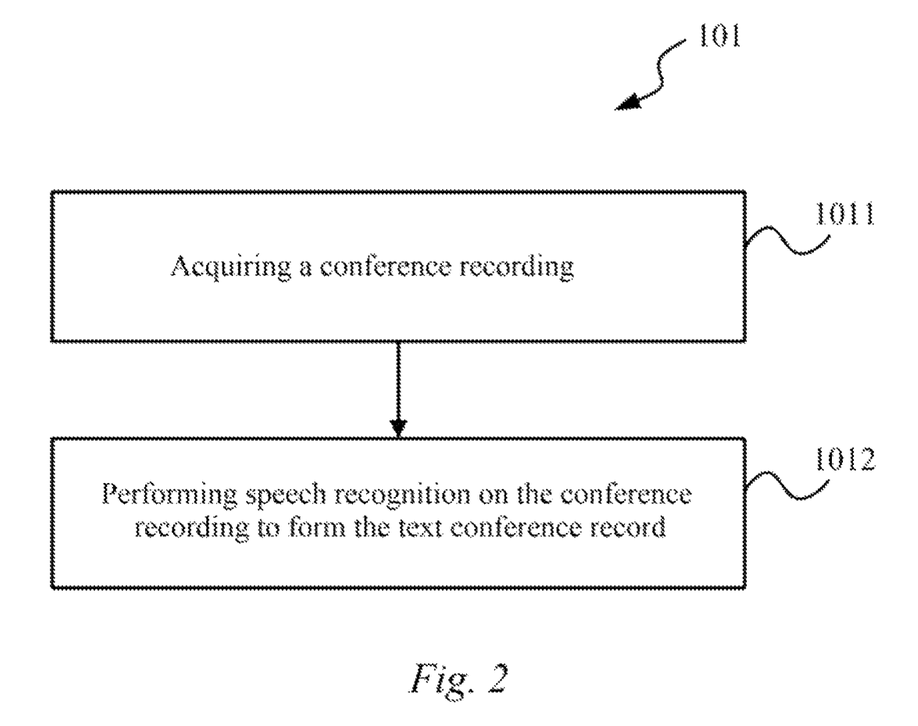
FIG. 2 is a flowchart showing some steps of the conference minutes generation method according to one embodiment of the present disclosure.

FIG. 2 is a flowchart showing some steps of the conference minutes generation method according to one embodiment of the present disclosure.

According to some example implementations, as shown in FIG. 2, said acquiring a text conference record in step 101, in some embodiments, comprises: acquiring a conference recording; and performing speech recognition on the conference recording to form the text conference record.

In some embodiments, a recording file of an on-site conference, an audio conference, or a video conference can be acquired, intelligent speech recognition is performed on the recording file by using a local processor or a processor on a server, and recognized text content is returned to form a text conference record. In this process, the text conference record can be translated into a desired language. For example, for an on-site conference, an audio conference, or a video conference in English, a formed text conference record can be in English or in Chinese.

Figure 3:
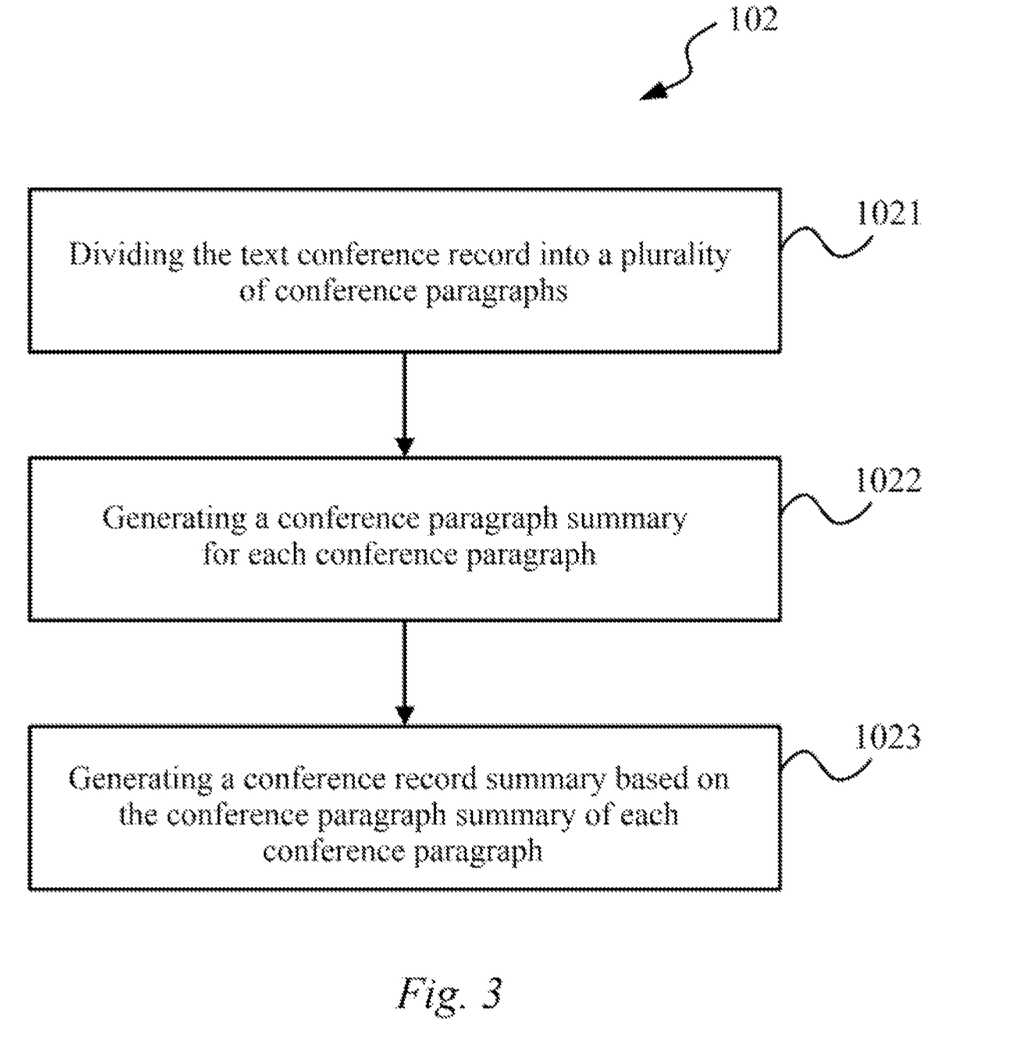
FIG. 3 is a flowchart showing some steps of the conference minutes generation method according to one embodiment of the present disclosure.

FIG. 3 is a flowchart showing some steps of the conference minutes generation method according to one embodiment of the present disclosure.

According to some example implementations, as shown in FIG. 3, step 102, in some embodiments, comprises: step 1021, dividing the text conference record into a plurality of conference paragraphs; step 1022, generating a conference paragraph summary for each conference paragraph; and step 1023, generating a conference record summary based on the conference paragraph summary of each conference paragraph.

In some embodiments, in step 1021, the text conference record is divided into a plurality of conference paragraphs in a time sequence according to a time and an order of utterance in the conference.

Figure 4:
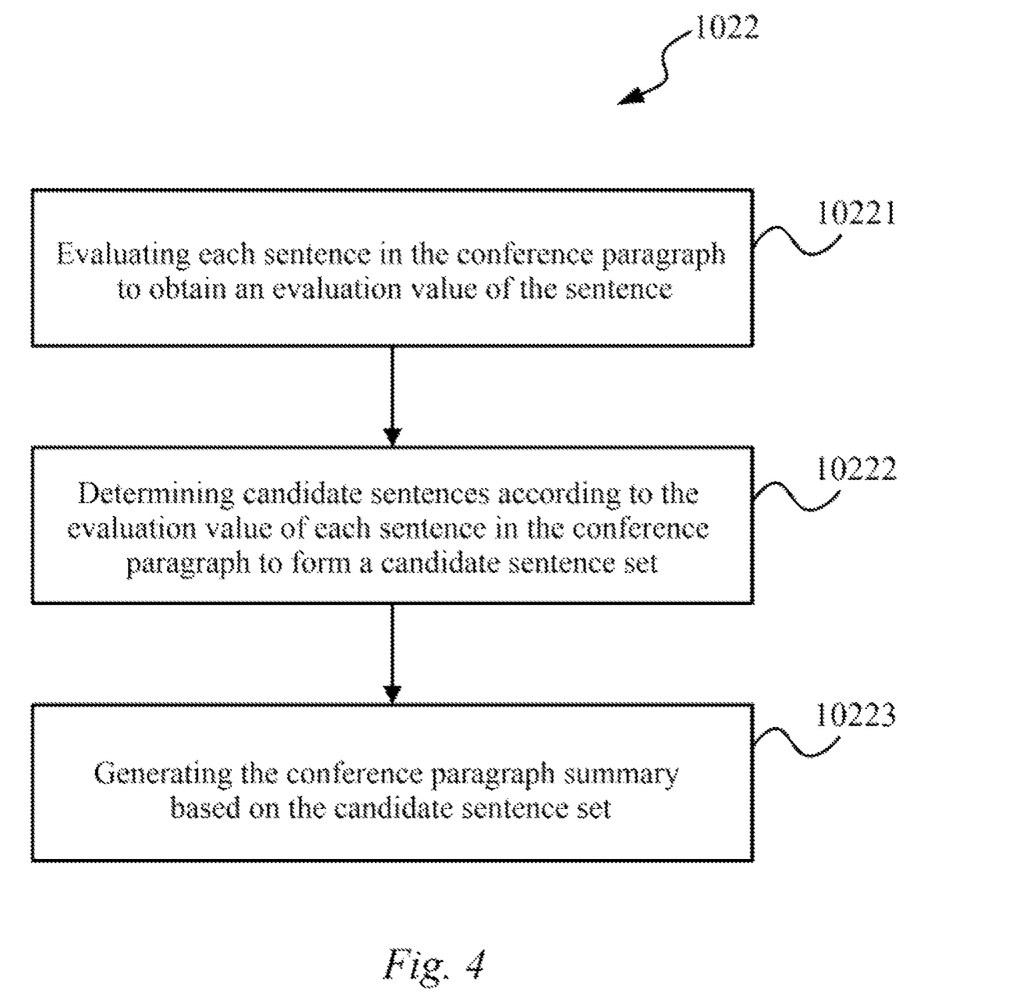
FIG. 4 is a flowchart showing some steps of the conference minutes generation method according to one embodiment of the present disclosure.

FIG. 4 is a flowchart showing some steps of the conference minutes generation method according to one embodiment of the present disclosure.

In some embodiments, as shown in FIG. 4, said generating a conference paragraph summary for each conference paragraph in step 1022 comprises: step 10221, evaluating each sentence in the conference paragraph to obtain an evaluation value of the sentence; step 10222, determining candidate sentences according to the evaluation value of each sentence in the conference paragraph to form a candidate sentence set; and step 10223, generating the conference paragraph summary based on the candidate sentence set.

According to some example implementations, said evaluating each sentence in the conference paragraph to obtain an evaluation value of the sentence in step 10221 may comprise: calculating a score value, a redundancy value, and a coherence value of the sentence; and calculating the evaluation value based on the score value, the redundancy value, and the coherence value.

According to some example implementations, the score value is calculated through a neural network, and a higher score value indicates that the sentence contains more important information.

In some embodiments, in the neural network used for obtaining the score value of the sentence, the entire sentence information may be added to an output vector expression based on information about sentence information capturing, thereby obtaining the score value of the sentence.

According to some example implementations, the redundancy value is obtained by comparing the similarity between the sentence and other sentences in the paragraph, and a higher redundancy value indicates that the degree of repetition of the sentence is greater.

In some embodiments, the redundancy value is calculated by comparing the similarity, such as semantic similarity or the degree of word repetition, between the sentence and the other sentences in the paragraph. If two sentences are similar in semantics and the degree of word repetition is large, the redundancy value of the sentence is relatively large. This calculation process may be implemented by using the neural network.

According to some example implementations, the coherence value is obtained by comparing the correlation between the sentence and other sentences in the paragraph, and a higher coherence value indicates that the relationship between the sentence and the other sentences in the paragraph is closer.

Two sentences to be compared may be or may not be adjacent.

In some embodiments, the coherence value is calculated by comparing a coherence degree, such as the correlation, between the sentence and the other sentences in the paragraph. If semantic correlation between two sentences is strong, the coherence value of the sentence is relatively large. This calculation process may also be implemented by using the neural network.

It can be seen that, in a calculation process of the score value, the redundancy value, and the coherence value, both word order information of a sentence and interactive information between the sentence and other sentences are considered. Therefore, a more accurate evaluation value can be provided for the sentence, so that sentence evaluation is more accurate in the present disclosure.

According to some example implementations, said determining candidate sentences according to the evaluation value of each sentence in the conference paragraph to form a candidate sentence set in step 10222 may comprise: selecting sentences meeting predetermined conditions to form the candidate sentence set, wherein the predetermined conditions comprise: the evaluation value is greater than an evaluation value threshold, the score value is greater than a score value threshold, the redundancy value is greater than a redundancy value threshold, and the coherence value is greater than a coherence value threshold.

In some embodiments, the score value threshold, the redundancy value threshold, the coherence value threshold, and the evaluation value threshold are set respectively, and sentences that simultaneously meet the following conditions: evaluation values being greater than the evaluation value threshold, score values being greater than the score value threshold, redundancy values being greater than the redundancy value threshold, and coherence values being greater than the coherence value threshold are selected as the candidate sentences to form the candidate sentence set.

According to some example implementations, a set of threshold conditions to be met by candidate sentences may also be selected. For example, only sentences whose evaluation values are greater than the evaluation threshold are selected as the candidate sentences to form the candidate sentence set, or sentences that simultaneously meet the following conditions: score values being greater than the score value threshold, redundancy values being greater than the redundancy value threshold, and coherence values being greater than the coherence value threshold are selected as the candidate sentences to form the candidate sentence set.

According to some example implementations, in step 10223, the conference paragraph summary is generated based on the candidate sentence set.

In some embodiments, the conference paragraph summary may be generated based on the candidate sentence set generated in step 10222. For example, the conference paragraph summary is generated by directly arranging the candidate sentences in order, or operations such as screening and deduplication are performed on the candidate sentence set, and after sentences that express the same or similar meanings are removed, the conference paragraph summary is generated by arranging the remaining sentences in the candidate sentence set in order.

In some embodiments, the candidate sentences may also be arranged in other orders, for example, under the guidance of predetermined rules, sentences in the candidate sentence set are reordered to generate the conference paragraph summary.

According to some example implementations, said generating a conference record summary based on the conference paragraph summary of each conference paragraph in step 1023 may comprise: evaluating each summary sentence in the conference paragraph summary to obtain an evaluation value of the summary sentence; determining candidate summary sentences according to the evaluation value of each summary sentence in the conference paragraph summary to form a candidate summary sentence set; and generating the conference record summary based on the candidate summary sentence set.

In some embodiments, in order to obtain the conference record summary of the entire conference, evaluation continues to be performed on summary sentences in a paragraph summary formed for each paragraph in the text conference record, thereby obtaining candidate summary sentences, forming a candidate summary sentence set, and forming the conference record summary based on the candidate summary sentence set. Step 1023 is equivalent to performing further extraction on each paragraph summary to form a "big summary" of the entire conference record.

According to some example implementations, said evaluating each summary sentence in the conference paragraph summary to obtain an evaluation value of the summary sentence may comprise: calculating a score value, a redundancy value, and a coherence value of the summary sentence; and calculating the evaluation value of the summary sentence based on the score value, the redundancy value, and the coherence value of the summary sentence.

In some embodiments, evaluation value calculation is performed on a summary sentence in a paragraph summary by using the same method as that used for a sentence contained in each paragraph in the text conference record, that is, the evaluation value of the summary sentence is calculated based on the score value, the redundancy value, and the coherence value of the summary sentence. Finally, the conference record summary is generated based on the evaluation value.

According to some example implementations, the conference instructions in step 103 comprises an entity instruction, an opinion instruction, and an attitude instruction, and said extracting conference instructions based on the text conference record comprises: extracting the entity instruction, the opinion instruction, and the attitude instruction from the text conference record.

Figure 5:
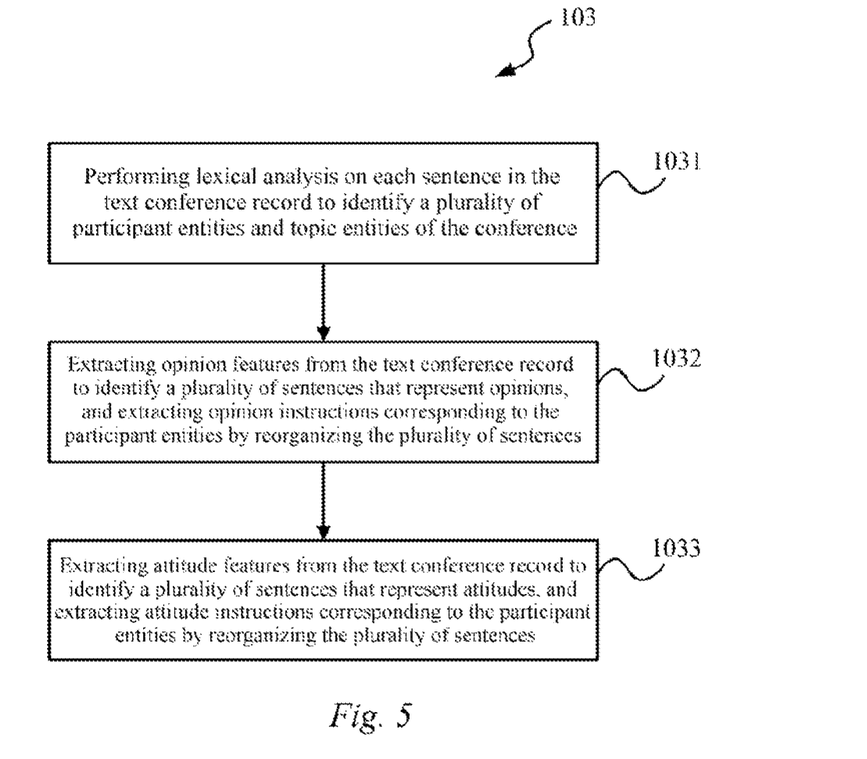
FIG. 5 is a flowchart showing some steps of the conference minutes generation method according to one embodiment of the present disclosure.

As shown in FIG. 5, according to some example implementations, said extracting the entity instruction, the opinion instruction, and the attitude instruction from the text conference record in step 103 comprises: step 1031, performing lexical analysis on each sentence in the text conference record to identify a plurality of participant entities and topic entities of the conference; step 1032, extracting opinion features from the text conference record to identify a plurality of sentences that represent opinions, and extracting opinion instructions corresponding to the participant entities by reorganizing the plurality of sentences; and step 1033, extracting attitude features from the text conference record to identify a plurality of sentences that represent attitudes, and extracting attitude instructions corresponding to the participant entities by reorganizing the plurality of sentences.

In some embodiments, in step 1031, lexical analysis is performed on each sentence in the text conference record. In a lexical analysis method, tokenization may be performed on the sentence to obtain a plurality of tokens, an entity word is identified from the plurality of tokens, part-of-speech tagging is performed on the plurality of tokens, and dependency parsing is performed on the entity word and the tokens according to the tagged part of speech. The recognized entity words may comprise participant entities and topic entities.

In some embodiments, in step 1032, the opinion features may be described with certain words or phrases. For example, the certain words or phrases may comprise opinions related to the participant entities. These words or phrases are extracted, sentences that contain these opinion features are identified, and the identified sentences are reorganized to extract the opinion instructions corresponding to the participant entities.

For example, words or phrases that describe opinion features may include, but are not limited to: "I think", "I can", "what to do", "how to do", "I know", "how", etc. In some embodiments, in step 1033, the attitude features may be described with certain words or phrases. For example, the certain words or phrases may comprise attitudes related to the participant entities. These words or phrases are extracted, sentences that contain these opinion features are identified, and the identified sentences are reorganized to extract the attitude instructions corresponding to the participant entities.

For example, words or phrases that describe attitude features may include, but are not limited to: "I will", "you will", "unwilling", "never mind", "cannot", "it does not matter", etc.

According to some example implementations, opinions and attitudes of different participant entities on the same topic entity or opinions and attitudes of the same participant entity on different topic entities are extracted from the text conference record based on the entity instruction, the opinion instruction, and the attitude instruction.

In some embodiments, opinions and attitudes of different participant entities on the same topic entity or opinions and attitudes of the same participant entity on different topic entities may be extracted from the text conference record based on the participant entities and the topic entities that are identified from the entity instruction and in conjunction with the opinion instruction and the attitude instruction that are corresponding to the participant entities.

For example, based on the same topic entity, opinion instructions and attitude instructions are extracted based on opinions and attitudes expressed by several participant entities on the topic entity, and then opinions and attitudes of different participant entities on the same topic entity are obtained.

Alternatively or additionally, for the same participant entity, opinion instructions and attitude instructions are extracted based on opinions and attitudes expressed by the participant entity on different topic entities, and then opinions and attitudes of the same participant entity on different topic entities are obtained.

According to some example implementations, the attitude instruction comprises attitude tendencies, and the attitude tendencies comprise: positive, negative, and neutral.

In some embodiments, an attitude tendency contained in an attitude instruction is described as positive, negative or neutral according to the tendency of words or phrases in attitude features. For example, attitude features such as "I will" and "you will" are used to identify a plurality of sentences representing attitudes from the text conference record, and the tendency of an attitude instruction obtained by reorganizing the plurality of sentences is considered to be "positive". Attitude features such as "unwilling" and "cannot" are used to identify a plurality of sentences representing attitudes from the text conference record, and the tendency of an attitude instruction obtained by reorganizing the plurality of sentences is considered to be "negative". Attitude features such as "never mind" and "it does not matter" are used to identify a plurality of sentences representing attitudes from the text conference record, and the tendency of an attitude instruction obtained by reorganizing the plurality of sentences is considered to be "neutral".

According to some example implementations, synonyms and/or near synonyms of the conference instructions are identified through word vector calculation, and the synonyms and/or the near synonyms are normalized to identify description for the same conference instruction.

In some embodiments, in order to more accurately recognize conference instructions, it is necessary to normalize synonyms and/or near synonyms of the same conference instruction. Features of conference instructions are calculated through word vector calculation, and features that are semantically similar and/or otherwise associated with the features of the conference instructions are normalized. For example, whether certain words and the features of the conference instructions have similarity is determined through word vector calculation, and if a determination result is that the similarity exists, all words having the similarity are identified as the same conference instruction.

According to some example implementations, the conference minutes generation method may further comprises an automatic extraction step, and the automatic extraction step comprises: extracting keywords and high-frequency words from the text conference record by performing semantic calculation on the text conference record and grading each word in the text conference record; and determining conference background, conference topics, conference objectives, conference conclusions, and/or task arrangements based on the keywords and the high-frequency words. For example, the keywords and the high-frequency words may comprise categories generated based on metadata and/or other information describing the conference. For example, the keywords and the high-frequency words may be keywords representing the conference background, the conference topics, the conference objectives, the conference conclusions, and/or the task arrangements. In some embodiments, conference background, conference topics, conference objectives, conference conclusions, and/or task arrangements may be determined by screening for sentences containing the above keywords and high-frequency words, and the determined conference background, conference topics, conference objectives, conference conclusions, and/or task arrangements are comprised in the final conference minutes as a part of the conference minutes. Moreover, semantic calculation on the text conference record may be performed under the supervision of users, so that content that users are interested in can be extracted.

In some embodiments, different participant entities may describe the conference background in different sentences. Then after keyword extraction and high-frequency word extraction are performed, two sentences are identified. In this case, for the same content, only one sentence is retained to describe the conference background, and the retained sentence about the conference background is put into the conference minutes.

According to some example implementations, the conference minutes generation method may further comprise a statistics collection step, and the statistics collection step comprises: collecting statistics about the number of utterances of each participant entity and/or the proportion of utterances of each participant entity in the total utterances, to reflect the utterance enthusiasm of each participant entity. Therefore, the conference minutes may further optionally comprise the utterance enthusiasm of all participant entities or several participant entities.

It can be learned from the above analysis that the conference minutes generated based on the conference minutes generation method may, in some embodiments, comprise: the conference record summary and the conference instructions, and may further optionally comprise the conference background, the conference topics, the conference objectives, the conference conclusions, the task arrangements and/or the utterance enthusiasm of each participant entity. Therefore, conference minutes can be extracted intelligently, thereby reducing time and manpower costs. Moreover, the conference minutes generated based on the method according to the embodiments of the present disclosure can not only accurately extract conference content, but also contain rich content. Therefore, detailed and accurate conference minutes can be obtained.

Figure 6:
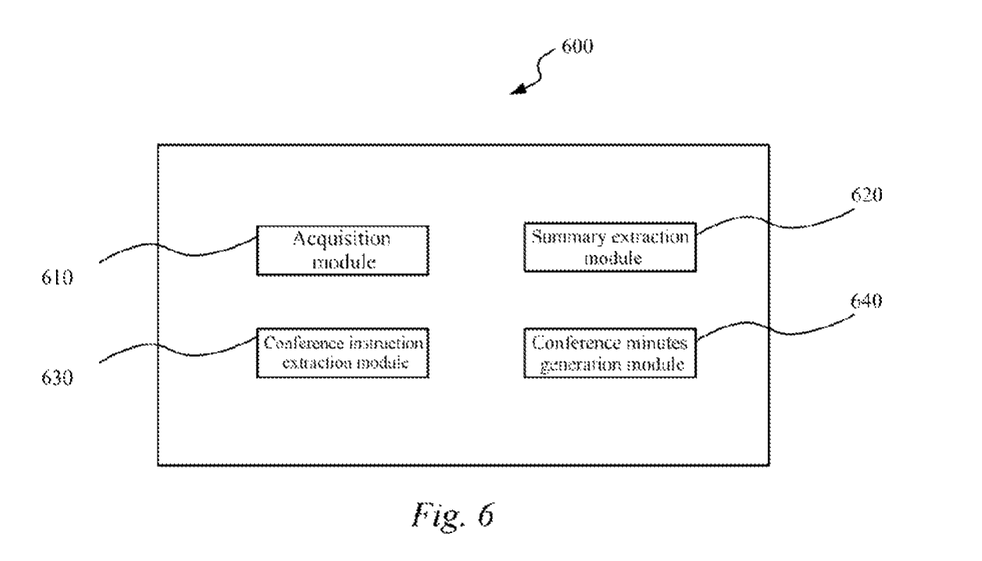
FIG. 6 is a schematic composition block diagram showing a device according to an example embodiment.

Corresponding to the conference minutes generation method provided in the several embodiments described above, another embodiment of the present disclosure further provides a conference minutes generation apparatus. Because the conference minutes generation apparatus provided in this embodiment of the present disclosure is corresponding to the conference minutes generation method provided in the several embodiments described above. Therefore, implementations of the conference minutes generation method described above are also applicable to the conference minutes generation apparatus provided in this embodiment, and details are not repeatedly described in this embodiment. FIG. 6 is a schematic structural diagram of a conference minutes generation apparatus according to one embodiment of the present disclosure. As shown in FIG. 6, the conference minutes generation apparatus 600 may comprise: an acquisition module 610, a summary extraction module 620, a conference instruction extraction module 630, and a conference minutes generation module 640. Specifically, the conference minutes generation apparatus comprises:

the acquisition module 610 configured to acquire a text conference record;

the summary extraction module 620 configured to divide the text conference record into a plurality of conference paragraphs, generate a conference paragraph summary for each conference paragraph, and generate a conference record summary based on the conference paragraph summary of each conference paragraph;

the conference instruction extraction module 630 configured to extract conference instructions based on the text conference record; and the conference minutes generation module 640 configured to generate the conference minutes based on the conference record summary and the conference instructions.

In some embodiments, the conference minutes generation apparatus 600 may further comprise an automatic extraction module (not shown in the figure), which is configured to: extract keywords and high-frequency words from the text conference record by performing semantic calculation on the text conference record and grading each word in the text conference record; and determine conference background, conference topics, conference objectives, conference conclusions, and/or task arrangements based on the keywords and the high-frequency words.

In some embodiments, the conference minutes generation apparatus 600 may further comprise a statistics collection module (not shown in the figure), and the statistics collection module is configured to collect statistics about the number of utterances of each participant entity and/or the proportion of utterances of each participant entity in the total utterances, to reflect the utterance enthusiasm of each participant entity.

According to an embodiment of the present disclosure, an electronic device is further provided, and the electronic device comprises: a processor; and a memory that stores a program, the program comprising instructions that, when executed by the processor, cause the processor to perform the conference minutes generation method described above.

According to an embodiment of the present disclosure, a computer-readable storage medium that stores a program is further provided, the program comprising instructions that, when executed by a processor of an electronic device, cause the electronic device to perform the conference minutes generation method described above.

Figure 7:
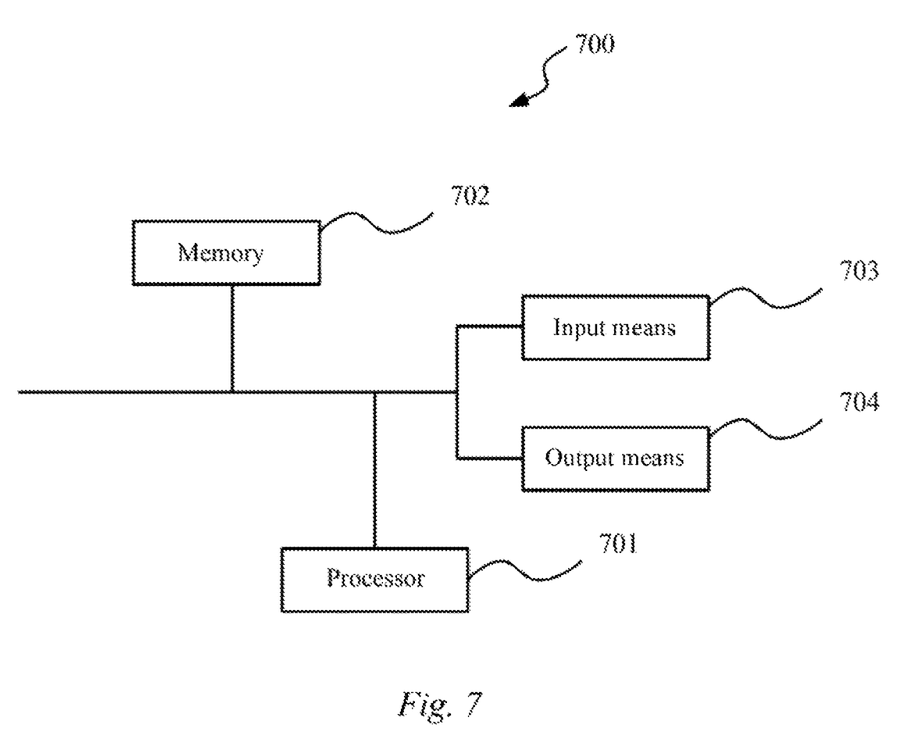
FIG. 7 is a structural block diagram showing an example computing device that can be applied to an example embodiment.

FIG. 7 is a block diagram of an electronic device configured to implement a conference minutes generation method according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the electronic device 700 comprises: one or more processors 701 and memories 702, and interfaces for connecting various components, comprising a high-speed interface and a low-speed interface. The various components are connected to each other by using different buses, and may be mounted on a common motherboard or in other manners as required. The processor may process instructions executed in the electronic device, comprising instructions stored in or on the memory to display graphical information of a GUI on an external input/output means (such as a display device coupled to an interface). In other implementations, if required, the plurality of processors and/or a plurality of buses can be used together with a plurality of memories. Similarly, a plurality of electronic devices can be connected, and each device provides some of the necessary operations (for example, as a server array, a group of blade servers, or a multi-processor system). In FIG. 7, one processor 701 is used as an example.

The memory 702 is a non-transitory computer-readable storage medium provided in the present disclosure. The memory stores instructions that can be executed by at least one processor, so that the at least one processor executes the conference minutes generation method provided in the present disclosure. The non-transitory computer-readable storage medium of the present disclosure stores computer instructions for causing a computer to perform the conference minutes generation method provided in the present disclosure.

As a non-transitory computer-readable storage medium, the memory 702 can be configured to store non-transitory software programs, non-transitory computer-executable programs and modules, such as program instructions/modules corresponding to the conference minutes generation method in the embodiments of the present disclosure (for example, the acquisition module 610, the summary extraction module 620, the conference instruction extraction module 630, and the conference minutes generation module 640 shown in FIG. 6). The processor 701 executes various functional applications and data processing of the server, that is, implements the conference minutes generation method in the above method embodiment, by running the non-transitory software programs, instructions, and modules stored in the memory 702.

The memory 702 may comprise a program storage area and a data storage area, wherein the program storage area may store an operating system and an application program required by at least one function; and the storage data area can store data created according to the use of the electronic device configured to implement the conference minutes generation method. Moreover, the memory 702 may comprise a high-speed random access memory, and may further comprise a non-transitory memory, such as at least one magnetic disk storage device, a flash memory device, or other non-transitory solid-state storage devices. In some embodiments, the memory 702 optionally comprises memories remotely arranged relative to the processor 701, and these remote memories may be connected, through a network, to the electronic device configured to implement the conference minutes generation method. Instances of the above network include, but are not limited to, the Internet, an enterprise intranet, a local area network, a mobile communications network, and a combination thereof.

The electronic device 700 configured to implement the conference minutes generation method may further comprise: an input means 703 and an output means 704. The processor 701, the memory 702, the input means 703, and the output means 704 may be connected by a bus or in other manners. In FIG. 7, the connection using a bus is taken as an example.

The input means 703 may receive entered digit or character information, and generate key signal input related to the user settings and function control of the electronic device configured to implement the conference minutes generation method, and may be input means such as a touchscreen, a keypad, a mouse, a trackpad, a touchpad, an indicator rod, one or more mouse buttons, a trackball, and a joystick. The output means 704 may comprise a display device, an auxiliary lighting apparatus (such as an LED), a tactile feedback apparatus (such as a vibration motor), etc. The display device may include, but is not limited to, a liquid crystal display (LCD), a light-emitting diode (LED) display, and a plasma display. In some implementations, the display device may be a touchscreen.

Various implementations of the systems and technologies described herein can be implemented in a digital electronic circuit system, an integrated circuit system, an ASIC (application-specific integrated circuit), computer hardware, firmware, software, and/or a combination thereof. These various implementations may comprise: the systems and technologies are implemented in one or more computer programs, wherein the one or more computer programs may be executed and/or interpreted on a programmable system comprising at least one programmable processor. The programmable processor may be a dedicated or general-purpose programmable processor that can receive data and instructions from a storage system, at least one input means, and at least one output means, and transmit data and instructions to the storage system, the at least one input means, and the at least one output means.

These computing programs (also referred to as programs, software, software applications, or code) comprise machine instructions of a programmable processor, and can be implemented by using an advanced procedure and/or object-oriented programming languages, and/or assembly/machine languages. As used herein, the terms "machine-readable medium" and "computer-readable medium" refer to any computer program product, device, and/or apparatus (for example, a magnetic disk, an optical disc, a memory, a programmable logic device (PLD)) configured to provide machine instructions and/or data to a programmable processor, comprising a machine-readable medium that receives machine instructions as machine-readable signals. The term "machine-readable signal" refers to any signal used to provide machine instructions and/or data to a programmable processor.

In order to provide interaction with a user, the systems and technologies described herein can be implemented on a computer which has: a display apparatus (for example, a CRT (cathode-ray tube) or an LCD (liquid crystal display) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) comprising a backend component, or a computing system (for example, an application server) comprising a middleware component, or a computing system (for example, a user computer with a graphical user interface or a web browser through which the user can interact with the implementation of the systems and technologies described herein) comprising a frontend component, or a computing system comprising any combination of the backend component, the middleware component, or the frontend component. The components of the system can be connected to each other through digital data communication (for example, a communications network) in any form or medium. Examples of the communications network comprise: a local area network (LAN), a wide area network (WAN), and the Internet.

A computer system may comprise a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present application can be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made according to design requirements and other factors. Any modifications, equivalent replacements, improvements, etc. within the spirit and principle of the present disclosure shall fall within the protection scope of the present disclosure.

The invention claimed is:

1. A method, comprising:
   acquiring a text conference record through speech recognition on audio data;
   dividing the text conference record into a plurality of conference paragraphs, generating a conference paragraph summary for each conference paragraph of the plurality of conference paragraphs, and generating, by using a neural network, a conference record summary based on the conference paragraph summary of each conference paragraph;
   extracting conference instructions based on the text conference record; and
   generating conference minutes based on the conference record summary and the conference instructions, wherein
   the conference instructions comprise an entity instruction, an opinion instruction, and an attitude instruction, and
   the extracting the conference instructions based on the text conference record comprises extracting the entity instruction, the opinion instruction, and the attitude instruction from the text conference record, wherein the extracting the entity instruction, the opinion instruction, and the attitude instruction from the text conference record comprises:

performing lexical analysis on each sentence in the text conference record to identify participant entities and topic entities of the conference;

extracting opinion features from the text conference record to identify a plurality of sentences that represent opinions, and extracting opinion instructions corresponding to the participant entities by reorganizing the plurality of sentences; and extracting attitude features from the text conference record to identify a plurality of sentences that represent attitudes, and extracting attitude instructions corresponding to the participant entities by reorganizing the plurality of sentences, wherein the method further comprising a statistics collection act, wherein the statistics collection act includes:
collecting statistics about one or more of a number of utterances of each participant entity or a proportion of utterances of each participant entity in total utterances; and determining utterance enthusiasm of each participant entity based on the one or more of the number of utterances or the proportion of utterances of the participant entity, or, wherein the statistics collection act includes:
collecting statistics about one or more of a number of utterances on each topic entity or a proportion of utterances on each topic entity in the total utterances; and determining utterance enthusiasm on each topic entity based on the one or more of the number of utterances on the topic entity or the proportion of utterances on the topic entity in the total utterances.

2. The method of claim 1, wherein the generating the conference paragraph summary for each conference paragraph comprises:
evaluating each sentence in the conference paragraph to obtain an evaluation value of the sentence;
determining candidate sentences based on the evaluation value of each sentence in the conference paragraph to form a candidate sentence set; and
generating the conference paragraph summary based on the candidate sentence set.

3. The method of claim 1, wherein the acquiring the text conference record comprises:
acquiring a conference recording as the audio data; and
performing speech recognition on the conference recording to form the text conference record.

4. The method of claim 2, wherein the evaluating each sentence in the conference paragraph to obtain the evaluation value of the sentence comprises:
calculating a score value, a redundancy value, and a coherence value of the sentence; and
calculating the evaluation value based on the score value, the redundancy value, and the coherence value.

5. The method of claim 4, wherein
the score value is calculated through a neural network, and a higher score value indicates that the sentence contains more concerned information.

6. The method of claim 4, wherein
the redundancy value is obtained by analyzing a similarity between the sentence and other sentences in the paragraph, and a higher redundancy value indicates that a degree of repetition of the sentence is greater.

7. The method of claim 4, wherein
the coherence value is obtained by analyzing a correlation between the sentence and other sentences in the paragraph, and a higher coherence value indicates that a relationship between the sentence and the other sentences in the paragraph is closer.

8. The method of claim 4, wherein the determining the candidate sentences based on the evaluation value of each sentence in the conference paragraph to form the candidate sentence set comprises:
selecting sentences that meet predetermined conditions to form the candidate sentence set,
wherein the predetermined conditions comprise: the evaluation value being greater than an evaluation value threshold, the score value being greater than a score value threshold, the redundancy value being greater than a redundancy value threshold, and the coherence value being greater than a coherence value threshold.

9. The method of claim 1, comprising one or more of:
extracting opinions and attitudes of different participant entities on a same topic entity based on the entity instruction, the opinion instruction, and the attitude instruction; and
extracting opinions and attitudes of a same participant entity on different topic entities based on the entity instruction, the opinion instruction, and the attitude instruction.

10. The method of claim 1, comprising:
identifying synonyms of the conference instructions through word vector calculation; and
normalizing the synonyms to identify description for a same conference instruction.

11. The method of claim 1, wherein
the attitude instruction comprises attitude tendencies, and the attitude tendencies comprise positive, negative, and neutral attitude tendencies.

12. The method of claim 1, wherein the generating the conference record summary based on the conference paragraph summary of each conference paragraph comprises:
evaluating each summary sentence in the conference paragraph summary to obtain an evaluation value of the summary sentence;
determining candidate summary sentences based on the evaluation value of each summary sentence in the conference paragraph summary to form a candidate summary sentence set; and
generating the conference record summary based on the candidate summary sentence set.

13. The method of claim 12, wherein the evaluating each summary sentence in the conference paragraph summary to obtain the evaluation value of the summary sentence comprises:
calculating a score value, a redundancy value, and a coherence value of the summary sentence; and
calculating the evaluation value of the summary sentence based on the score value, the redundancy value, and the coherence value of the summary sentence.

14. The method of claim 1, further comprising an automatic extraction act,
wherein the automatic extraction act includes:
extracting keywords and high-frequency words from the text conference record by performing semantic calculation on the text conference record and grading each word in the text conference record; and
determining at least one of conference background, conference topics, conference objectives, conference conclusions, and task arrangements based on the keywords and the high-frequency words.

15. An electronic device, comprising:
a processor; and a memory that stores a program, the program comprising instructions that, when executed by the processor, cause the processor to perform acts including:
acquiring a text conference record through speech recognition on audio data;
dividing the text conference record into a plurality of conference paragraphs, generating a conference paragraph summary for each conference paragraph of the plurality of conference paragraphs, and generating, by using a neural network, a conference record summary based on the conference paragraph summary of each conference paragraph;
extracting conference instructions based on the text conference record; and
generating conference minutes based on the conference record summary and the conference instructions, wherein
the conference instructions comprise an entity instruction, an opinion instruction, and an attitude instruction, and
the extracting the conference instructions based on the text conference record comprises extracting the entity instruction, the opinion instruction, and the attitude instruction from the text conference record, wherein the extracting the entity instruction, the opinion instruction, and the attitude instruction from the text conference record comprises:
performing lexical analysis on each sentence in the text conference record to identify participant entities and topic entities of the conference;
extracting opinion features from the text conference record to identify a plurality of sentences that represent opinions, and extracting opinion instructions corresponding to the participant entities by reorganizing the plurality of sentences; and
extracting attitude features from the text conference record to identify a plurality of sentences that represent attitudes, and extracting attitude instructions corresponding to the participant entities by reorganizing the plurality of sentences,
wherein the processor is further caused to perform a statistics collection act,
wherein the statistics collection act includes:
collecting statistics about one or more of a number of utterances of each participant entity or a proportion of utterances of each participant entity in total utterances; and
determining utterance enthusiasm of each participant entity based on the one or more of the number of utterances or the proportion of utterances of the participant entity,
or, wherein the statistics collection act includes:
collecting statistics about one or more of a number of utterances on each topic entity or a proportion of utterances on each topic entity in the total utterances; and
determining utterance enthusiasm on each topic entity based on the one or more of the number of utterances on the topic entity or the proportion of utterances on the topic entity in the total utterances.

16. A non-transitory computer-readable storage medium that stores a program, the program comprising instructions that, when executed by a processor of an electronic device, cause the electronic device to perform acts including:
acquiring a text conference record through speech recognition on audio data;
dividing the text conference record into a plurality of conference paragraphs, generating a conference paragraph summary for each conference paragraph of the plurality of conference paragraphs, and generating, by using a neural network, a conference record summary based on the conference paragraph summary of each conference paragraph;
extracting conference instructions based on the text conference record; and
generating conference minutes based on the conference record summary and the conference instructions, wherein
the conference instructions comprise an entity instruction, an opinion instruction, and an attitude instruction, and
the extracting the conference instructions based on the text conference record comprises extracting the entity instruction, the opinion instruction, and the attitude instruction from the text conference record, wherein the extracting the entity instruction, the opinion instruction, and the attitude instruction from the text conference record comprises:
performing lexical analysis on each sentence in the text conference record to identify participant entities and topic entities of the conference;
extracting opinion features from the text conference record to identify a plurality of sentences that represent opinions, and extracting opinion instructions corresponding to the participant entities by reorganizing the plurality of sentences; and
extracting attitude features from the text conference record to identify a plurality of sentences that represent attitudes, and extracting attitude instructions corresponding to the participant entities by reorganizing the plurality of sentences,
wherein the electronic device is further caused to perform a statistics collection act,
wherein the statistics collection act includes:
collecting statistics about one or more of a number of utterances of each participant entity or a proportion of utterances of each participant entity in total utterances; and
determining utterance enthusiasm of each participant entity based on the one or more of the number of utterances or the proportion of utterances of the participant entity,
or, wherein the statistics collection act includes:
collecting statistics about one or more of a number of utterances on each topic entity or a proportion of utterances on each topic entity in the total utterances; and
determining utterance enthusiasm on each topic entity based on the one or more of the number of utterances on the topic entity or the proportion of utterances on the topic entity in the total utterances.

* * * * *